United States Patent [19]

McSparran et al.

[11] 4,301,899

[45] Nov. 24, 1981

[54] SYSTEM FOR AUTOMATICALLY CONTROLLING AN ELECTRICALLY PROPELLED TRACTION VEHICLE TRAVERSING A GAP IN WAYSIDE SOURCE OF POWER

[75] Inventors: Lloyd W. McSparran; Paul T. Ryan, both of Erie; Russell M. Smith, North East, all of Pa.

[73] Assignee: General Electric Company, Erie, Pa.

[21] Appl. No.: 142,292

[22] Filed: Apr. 21, 1980

[51] Int. Cl.³ .............................................. B60L 1/00
[52] U.S. Cl. .......................................... 191/3; 191/15; 104/298; 246/187 B
[58] Field of Search ................. 191/6, 2, 15, 18, 19, 191/3; 104/295, 298; 246/182 B, 187 C, 187 B

[56] References Cited

U.S. PATENT DOCUMENTS

| 3,202,816 | 8/1965 | Gregg | 104/298 X |
| 3,687,082 | 8/1972 | Burke | 104/298 |
| 3,876,171 | 4/1975 | Birkin | 246/63 A |
| 3,957,236 | 5/1976 | Phelps | 246/187 B |

*Primary Examiner*—Richard A. Schacher
*Attorney, Agent, or Firm*—Albert S. Richardson, Jr.

[57] ABSTRACT

A plurality of stationary markers (A, B, C, and D) are symmetrically placed at predetermined locations in the right of way of an electrically propelled traction vehicle on opposite sides of a transition point coinciding with a gap (14) between adjacent sections (13a, 13b) of a wayside conductor. Proximity sensing means (PSR, PSL) on the vehicle provide discrete output signals on a first line (43) upon passing the first and third markers (A and C) and on a second line (44) upon passing the second and fourth markers (B and D). Receiver logic means (42) includes means (108, 111-115, and 118-127), responsive to the output signals on the first and second lines, respectively, for producing a first control signal (on line 51) during the first-to-third marker interval and a second control signal (on line 50) during the second-to-third marker interval. Means (24, 25, 55, and 60-71) is provided for disconnecting the vehicle's propulsion system (27, 29, M) from a current collector (16) either in delayed response to the start of the first control signal or in immediate response to the start of the second control signal, whereby the vehicle will coast unpowered as its current collector slides across the gap in the wayside conductor. Additional means (56, 75, 82-85) is provided for reconnecting the propulsion system in response to the termination of both of the control signals. Malfunction indicating means (52, 130-145) is provided for detecting any discontinuity in the normal sequence of output signals that are provided on the first and second lines as the proximity sensing means passes all of the markers in the vicinity of the transition point.

16 Claims, 6 Drawing Figures

SYSTEM FOR AUTOMATICALLY CONTROLLING AN ELECTRICALLY PROPELLED TRACTION VEHICLE TRAVERSING A GAP IN WAYSIDE SOURCE OF POWER

BACKGROUND OF THE INVENTION

1. Field of the Invention

This invention relates generally to railway signaling systems, and it relates more particularly to means useful on electrified railroads for allowing trains safely and automatically to traverse gaps in the overhead electric power distributing conductor.

An electrically driven land vehicle such as an electric locomotive or a self-propelled transit car is equipped with a current collector that maintains sliding or rolling contact with a wayside conductor extending parallel to the rails or guideway defining the vehicle's path of movement along the railroad right of way. Typically, the wayside conductor is either in overhead catenary, in which case the current collector is a pneumatic or spring-loaded pantograph on the roof of the vehicle, or a third rail, in which case the current collector is a "shoe" in sliding contact with the third rail. In either case, the collector provides on board the vehicle a voltage whose magnitude is determined by the voltage magnitude of a source of electric power that energizes the particular section of the wayside conductor with which the collector is cooperating. This voltage is applied to the input of controllable power conditioning means which in turn supplies electric power to electric traction motors for propelling the vehicle along the right of way at the desired speed and in the proper direction. Where the wayside power is characterized by alternating current (a-c) rather than direct current (d-c), the power conditioning means on board the vehicle usually includes a single-phase voltage stepdown main transformer.

The wayside conductor is part of an electric power distribution system that is fed from a plurality of sources. Such sources may comprise the railroad's own low voltage d-c or a-c power generating plants located near the right of way, or they may comprise electric utility-owned substations that supply highvoltage 3-phase a-c power at commercial power frequencies (e.g., 60 Hz in the United States, 50 Hz in Europe). Where 3-phase power is used, it is common practice to feed adjacent sections of the wayside conductor from different phases of the source, and at predetermined buffer zones or transition points along the right of way the adjacent sections are electrically insulated from one another to avoid short circuiting the two different phases. At each such "phase break," a neutral or "dead" (i.e., non-conducting) segment is provided in the wayside conductor to bridge a gap between the adjacent "live" (i.e., energized) sections thereof.

Such dead segments or gaps in the wayside conductor are also required on electrified railroad systems where adjacent sections of the conductor are respectively energized by different power sources characterized by unequal frequencies and/or diverse voltage magnitudes. For example, d-c and a-c sources might be mixed on a given railroad line, or adjacent sections of a totally d-c line might have different voltage magnitudes. In another practical example, there is a plan to improve the "Northeast Corridor" of the United States, which refers to the electrified railroad extending from Washington, D.C. to New York City and beyond, by converting its mainline catenary system from the existing single-phase, 25 Hz, 11 KV, a-c power to commercially available 60 Hz power at either 12.5 KV or 25 KV. However, most of the electrified branch lines of this Corridor will not be so converted. Consequently, the two new sources of power (60 Hz, 12.5 KV and 60 Hz, 25 KV) and the old source (25 Hz, 11 KV) will be comingled in the Northeast Corridor, and in the future the electric locomotives or self-propelled transit cars operating in this environment will experience transitions between some or all possible combinations of these different sources.

An electrically propelled traction vehicle operating on an electrified railroad with diverse power sources should have means for anticipating each transition point so that, as it reaches a gap in the wayside conductor, the vehicle can coast through the gap in an unpowered state. This will avoid damage that might otherwise occur if an electric arc were drawn as the current collector on the vehicle separates from a live section of the wayside conductor on entering the dead segment thereof at the transition point. If adjacent sections of the wayside conductor are energized by sources having different voltage magnitudes, the vehicle's power conditioning means should also be appropriately adjusted or reconnected before the propulsion system is repowered so as to avoid damage in the event the transition has been from a low voltage section to a high voltage section of the conductor. Several known systems for accomplishing these results will now be briefly summarized.

2. Description of the Prior Art

In accordance with one prior art strategy for traversing a voltage changeover gap between adjacent sections of a wayside conductor, the desired sequence of operations is performed manually by the operator of the vehicle. When alerted by appropriate signals indicating that the vehicle is about to reach a transition point between two different wayside voltages (both of which are known), the operator first shuts down the power conditioning means, then opens a circuit breaker connected between the current collector and the power conditioning means, then actuates either a tap changer associated with the secondary winding of the main transformer (in a-c systems) or a series/parallel changeover switch associated with each pair of motors (in d-c systems), and finally, after the vehicle has coasted beyond the transition point, recloses the circuit breaker. Such manual operations are obviously impractical for multiple unit trains and for any railroad line having successive phase breaks spaced relatively close together.

In U.S. Pat. No. 3,957,236 granted on May 18, 1976, to D. R. Phelps and P. T. Ryan and assigned to the General Electric Company, there is described and claimed an improved method of traversing a predetermined transition point between successive diverse wayside power sources. This method comprises the steps of automatically opening a circuit on board an electrically propelled vehicle as the vehicle approaches the transition point to disconnect the vehicle from the wayside power source on the side of the transition point from which it is approaching, changing a power switch on board the vehicle from a first power source position to a second power source position (if required), and automatically closing the circuit when the vehicle passes to the opposite side of the transition point, thereby connecting the vehicle to the next wayside power source.

To indicate when the vehicle is in the vicinity of the transition point, a pair of signal devices are placed along the right-of-way on opposite sides of that point. These devices, as disclosed by Phelps and Ryan, are active circuit elements, and one can transmit a different signal than the other so that a cooperating receiver on board the vehicle can differentiate the one from the other as the vehicle passes their respective locations. Thus, the receiver not only detects the position of the vehicle with respect to the transition point but also indicates the voltage magnitude of the wayside power source at that position. Signal frequencies need to be carefully selected so as to avoid conflicts with existing automatic cab signaling systems.

Another automatic control system, heretofore known in England, uses passive trackside magnets instead of active signal transmitting devices. As the vehicle approaches a transition point, a magnetic field detector on board the vehicle passes over a first one of the magnets and activates relays that open a traction power circuit breaker and that reset the detector. On leaving the transition point, the same detector passes over the other magnet (which has the same polarity as the previous one), and this time it responds by activating relays that initiate reclosure of the circuit breaker and again reset the detector. Means is provided on the vehicle for sensing the actual magnitude of voltage on the new section of wayside conductor when the vehicle leaves the transition point, and before the circuit breaker is allowed to release this sensing means actuates a voltage changeover switch (if required) to reconnect the main transformer in accordance with the sensed voltage magnitude.

SUMMARY OF THE INVENTION

The general objective of the present invention is to provide a versatile and reliable system that will enable an electrically propelled traction vehicle to move safely, automatically, and at high speed past voltage changeover gaps and/or phase breaks in a sectionalized wayside conductor whose various sections are respectively energized by dissimilar electric power sources.

The invention is intended for use in combination with a traction vehicle moving along a predetermined path in a right of way having predetermined transition points that concide with gaps between adjacent sections of the wayside conductor. The vehicle includes controllable power conditioning means having source and load terminals, means including a circuit interrupter for connecting said source terminals to a current collector that maintains sliding contact with the wayside conductor, and one or more electric motors connected to the load terminals of the power conditioning means for propelling the vehicle along the right of way in either a forward or a reverse direction. In carrying out the invention in one form, first, second, third, and fourth stationary markers are placed at predetermined locations in the right of way in the vicinity of each of said predetermined transition points. The locations of the first and second markers are one one side of the transition point, with the first marker being spaced farther than the second from that point, and the locations of the third and fourth markers are on the other side of the transition point, with the fourth marker being spaced farther than the third from that point. On the vehicle there are proximity sensing means so placed as to pass in close proximity to the stationary markers as the vehicle moves along the right of way in the vicinity of a transition point, with the proximity sensing means being arranged to provided, upon passing the first marker and also upon passing the third marker, discrete output signals on a first line and to provide, upon passing the second marker and also upon passing the fourth marker, discrete output signals on a second line. Means is provided for producing a first control signal that starts when the proximity sensing means provides an output signal on the first line, indicating it is passing the first marker as the vehicle (moving in a forward direction) is approaching the predetermined transition point from the aforesaid one side, and that terminates when the sensing means provides the next output signal on the first line, thereby indicating it is passing the third marker on the other side of the transition point. Second means is provided for producing a second control signal that starts when the proximity sensing means provides an output signal on the second line, indicating it is passing the second marker as the vehicle approaches the transition point from the aforesaid one side, and that terminates when the sensing means provides the aforesaid next output signal on the first line which indicates it is passing the third marker.

In one aspect of the invention, means is provided for opening the circuit interrupter in response to the production of either the first control signal or the second control signal, whereby the power conditioning means is disconnected from the current collector as the vehicle traverses the transition point, and means responsive to the termination of both control signals supplies a reclose signal to the circuit interrupter which responds by automatically reconnecting the power conditioning means to the current collector after the vehicle has moved beyond the third marker. The redundancy thus provided ensures that the vehicle will safely traverse the transition point even though either one of the first and second markers is missing. In another aspect of the invention, a malfunction of the system is indicated, in the event the proximity sensing means is defective or any one or more (but less than all) of the four markers is missing, by providing means for detecting any discontinuity in the normal sequence of output signals that are provided on the first and second lines as the proximity sensing means passes all four markers in the vicinity of a transition point.

The invention will be better understood and its various objects and advantages will be more fully appreciated from the following description taken in conjunction with the accompanying drawings.

DESCRIPTION OF THE PREFERRED EMBODIMENT

Figure 1:
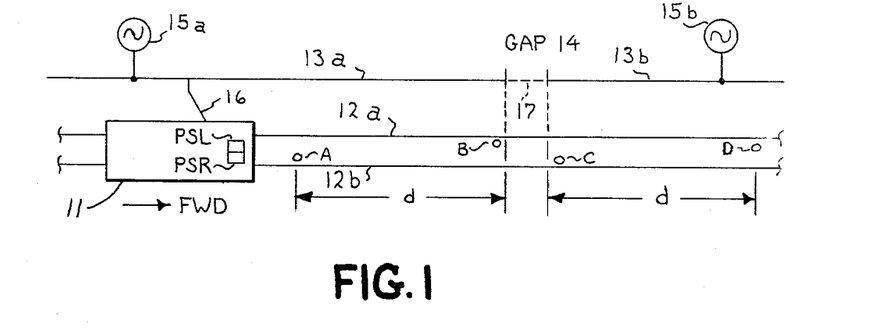
FIG. 1 is a schematic plan view of a pair of rails on which an electrically propelled vehicle is approaching a predetermined transition point along a railroad right of way, which point corresponds to a gap in a parallel wayside conductor.

FIG. 1 is a schematic diagram of an electrically propelled land vehicle 11 moving in a forward direction on a pair of rails 12a and 12b forming a path along a railroad right of way that is paralleled by a sectionalized wayside conductor. The wayside conductor includes two adjacent sections 13a and 13b which are separated by a gap 14 and which are respectively energized by different electric power sources 15a and 15b. In the preferred embodiment of this invention the wayside conductor is actually an overhead catenary, although the invention is useful in conjunction with other equivalent conductors such as a third rail. The vehicle 11 includes a suitable current collector 16 that cooperates with the wayside conductor, as by making sliding or rolling contact therewith, to provide on board the vehicle a voltage whose magnitude is determined by the voltage magnitude of the power source energizing the particular section of the conductor with which the collector is cooperating, and this voltage supplies an electric propulsion system on the vehicle.

The two power sources 15a and 15b have dissimilar electrical characteristics. For example, source 15a may be characterized by 25 Hz 11 KV alternating voltage, whereas the source 15b may be characterized by 60 Hz 25 KV alternating voltage. Alternatively, the two sources may be merely different phases of the same 3-phase electric power distribution system. Other possibilities are to supply one of the wayside conductor sections with d-c power rather than a-c power, or to supply both with d-c power having two different voltage magnitudes. In any case, the gap 14 between sections 13a and 13b is one of a series of such gaps that are provided in the wayside conductor at predetermined transition points along the right of way in order electrically to insulate from each other the respectively adjacent sections of this conductor. As a practical example, the improved catenary system on the above-mentioned Northeast Corridor will be divided into sections averaging approximately seven miles (11.3 Km) in length, and the gap between each pair of adjacent sections will be 15 feet (4.6 M) long. To maintain a uniform running surface for the collector 16 as it traverses each phase break or voltage change transition point, the gap 14 is bridged by a neutral or dead segment 17 of the catenary. The dead segment 17 can comprise, for example, a short length of insulated runner followed by a grounded trolley wire followed in turn by another short length of insulated runner.

When the vehicle 11 is about to traverse a transition point along the right of way, it is important to disconnect the propulsion system from the current collector 16 so that the latter does not draw an electric arc as it leaves the live section 13a of the catenary and slides onto the dead segment 17. In order to alert the vehicle that it is approaching the transition point, a plurality of stationary markers or beacons are installed between the rails 12a and 12b at predetermined locations on each side of the catenary gap 14, and the vehicle 11 carries cooperating proximity sensing means.

In FIG. 1 the trackside markers and vehicle-mounted sensing means have been shown in plan view. In the preferred embodiment of the present invention, four markers A, B, C, and D are needed, but additional markers could be used if desired. The first and second markers A and B are located on one side of the transition point, with A being spaced farther than B from the gap 14. The third and fourth markers C and D are located on the other side of the transition point, with D being spaced farther than C from the gap 14. The distance d between marker A and the gap 14 (and the distance d between the marker D and the gap 14) depends on the maximum and minimum speeds at which the vehicle is expected to move along the right of way in the vicinity of the transition point. Criteria for selecting d will be discussed hereinafter in connection with the description of FIG. 3. The second and third markers B and C are placed relatively close to the catenary gap 14. Assuming that the forward direction of the vehicle is from left to right as viewed in FIG. 1, the vehicle will pass the markers A, B, C, and D in their listed sequence.

In accordance with the present invention, the cooperating proximity sensing means on board the vehicle not only will detect the trackside markers as it passes them but also will discriminate between markers A and C on the one hand and markers B and D on the other. This can be accomplished in a variety of different ways. For example, if the four markers were active signal transmitters (such as those used in the above-cited Phelps et al patent), markers A and C could emit differently coded signals than markers B and D, and a pair of receivers on the vehicle could be respectively tuned to selectively respond to these different signals. Alternatively, if the markers were passive magnets centered between the rails, with A and C having opposite polarity with respect to B and D, magnetic field sensing means on the vehicle could be arranged to discriminate between north-south and south-north polarities. In the presently preferred embodiment of the invention, however, the markers are actually permanent magnets whose polarities are in agreement, and markers A and C are displaced laterally from B and D with respect to the path of movement of the vehicle 11. More specifically, markers A and C are on the right side of the track centerline looking in the forward-going direction of the vehicle, and magnets B and D are on the left side of the track centerline as viewed in this same direction. In this embodiment the proximity sensing means on board the vehicle 11 comprises two separate proximity sensors PSR and PSL, each of which preferably is a magnetically actuated reed switch. The first proximity sensor PSR is mounted on a part of the vehicle that passes in close proximity to the markers A and C as the vehicle moves along the right of way in the vicinity of the transition point, and the reed switch in this sensor is thus actuated upon passing marker A and also upon passing C. The second proximity sensor PSL is mounted on a part of the vehicle that passes in close proximity to markers B and D as the vehicle moves along the right of way in the vicinity of the transition point, and the reed switch in this sensor is thus actuated upon passing the marker B and also upon passing D. This arrangement can be seen better in FIG. 2.

Figure 2:
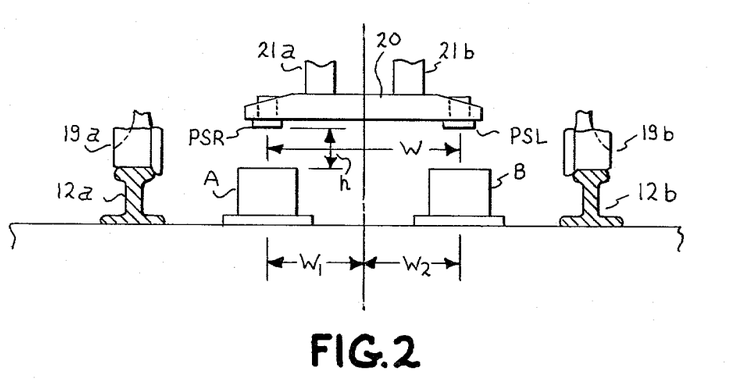
FIG. 2 is a view taken through a crosssection of the rails at the transition point and showing a portion of the front end of the approaching vehicle.

FIG. 2 is a partial front end view of the vehicle 11 through a section of the track under the catenary gap 14, and it reveals markers A and B placed between the rails 12a and 12b on opposite sides of the track centerline. Marker A is anchored to one railroad tie with its centerline spaced a distance $w_1$ from the track centerline, and marker B is anchored to another tie with its centerline spaced a distance $w_2$ from the track centerline. The upper surfaces of the markers A and B have approximately the same elevation as the top of the rails. A pair of flanged wheels on the leading axle of the vehicle 11 are shown at 19a and 19b in FIG. 2, and a horizontal support member 20 is suspended by a pair of vertical angles 21a and 21b from the underframe (not shown) of the vehicle. The first and second proximity sensors PSR and PSL are respectively mounted near opposite ends of the member 20 in symmetrical positions with respect to the longitudinal centerline of the vehicle, and their centers are spaced apart by a distance w. The lower surfaces of the sensors are in a plane spaced above the markers A and B by a static distance h. By way of example, in one practical embodiment of the invention w is two feet (0.6 M) and h is approximately five inches (13 Cm).

Ideally the support member 20 is located directly under the point of contact between the vehicle's current collector 16 and the catenary. Alternatively, the first proximity sensor PSR could be located near the right front corner of the vehicle (as viewed in FIG. 1) and the second proximity sensor PSL could be located near the left rear corner of the vehicle. For a vehicle that is always propelled in its forward direction along the right of way, it is advantageous to locate both proximity sensors near the front end of the vehicle ahead of the leading axle, and in this end location the supporting angles 21a and 21b should be spaced far enough apart to avoid physically interfering with the draft gear of the vehicle. Yet another possible location for the proximity sensors is midway between the ends of the vehicle.

The distances $w_1$ and $w_2$ in FIG. 2 depend on the placement of the proximity sensors PSR and PSL on the vehicle and the positions of the markers A and B in the right of way. If a marker is located at a straight section of the track, $w_1$ (as well as $w_2$) equals w/2. Where a marker is placed at a curved section of the track, $w_1$ (and $w_2$) will deviate from w/2 so that the associated proximity sensor can pass in close proximity to the marker as the vehicle negotiates the curve. The amount and direction of deviation depends upon where PSR (or PSL) is located along the underframe of the vehicle and whether the marker is on the outside or the inside of the curve. This deviation is relatively slight if, as illustrated in FIG. 1, the front end location of the proximity sensors is used.

In the preferred embodiment of the present invention, each of the markers A, B, C, and D comprises a permanent magnet which produces a minimum vertical flux density of approximately 10 Gauss (equivalent to a magnetic field intensity of 800 amperes/meter) at a height of 8.5 inches (21.6 Cm) above its upper surface. In a practical embodiment of the invention, the marker is a 6-inch (15 Cm) long rectangular bar of Alnico 5 material having longitudinally oriented magnetic domains, which bar is suitable encapsulated inside a steel pipe having a diameter of approximately 8 inches (20 Cm) and an axial dimension of approximately 6 inches (15 Cm). A flat plate welded across one end of the pipe (at the south pole of the magnet) provides a base that can be bolted to a railroad tie. The pipe and baseplate provide a low reluctance path (relative to air) for magnetic flux so that the top edge of the pipe has south polarity. This combination (concentrated north pole in the center of the marker with distributed south pole around the periphery of the marker) provides the requisite vertical flux above the center of the marker.

In some applications of the invention it may be desirable to use an electromagnet rather than a permanent magnet and to control the electromagnet so that it is energized in response to selected conditions, such as in response to the operation of a nearby track switch, or in response to an approaching vehicle.

In the preferred embodiment of the invention, as was previously mentioned, each of the proximity sensors PSR and PSL comprises a magnetically actuated reed switch. The reed switch, which is encapsulated in a non-magnetizable housing to protect it from the harsh environment on the underside of an electric locomotive or transit car, has a normally closed contact that is externally connected in circuit with a source of d-c control power, a diode, a resistor, and other components (not shown) so as to provide a discrete output signal each time the contact is opened. The contact opens when the switch intersects a verticle flux field from a nearby strong magnet. In a practical embodiment of the invention, the reed switch is sufficiently sensitive to open its contact when passing over the north pole of one of the above-described markers at a distance h of 8.5 inches (21.6 Cm) or less. The area around and under the reed switch should be clear of any ferromagnetic materials that might divert the magnetic flux of a marker.

Figure 3:
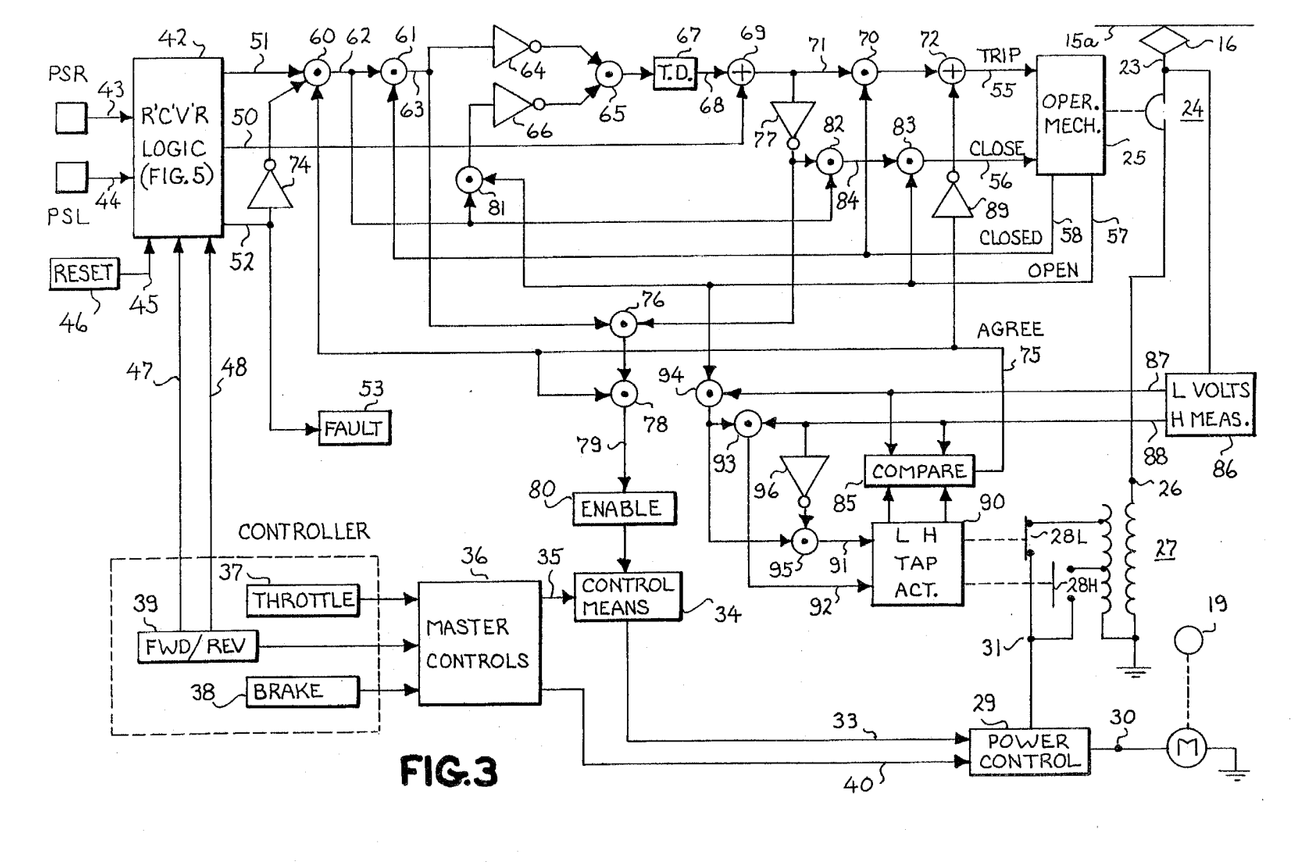
FIG. 3 is a functional block diagram of the electrical propulsion system on board the vehicle and of the system of the present invention for automatically controlling the circuit interrupter and the transformer tap changer of the propulsion system as the vehicle traverses the transition point.

FIG. 3 is a schematic circuit diagram of the system on board the vehicle that is responsive to the discrete output signals from the above-described proximity sensors PSR and PSL. In FIG. 3 the current collector 16 of the vehicle is shown as a pantograph. The pantograph 16 is connected by a means of a line 23 and a circuit interrupter 24 to a source terminal 26 of controllable power conditioning means which preferably includes a voltage step-down main transformer 27, switchable means 28L,28H having at least two alternative states, and a power control module 29. The power conditioning means is part of the electric propulsion system of the vehicle, and it supplies power of desired characteristics to a plurality of adjustable speed electric traction motors. Any one of a variety of different types of motors can be used, including round or linear a-c motors. In this specification the traction motors are assumed to be of a conventional d-c type, with their rotors being mechanically coupled via suitable gear trains to the respective wheel sets of the vehicle. FIG. 3 shows only one motor M coupled to a wheel set 19. This motor is connected to the output terminal 30 of the power control module 29, which terminal is also a load terminal of the power conditioning means.

The magnitude of voltage applied to the motor M will depend on the voltage magnitude of the power source that is energizing the catenary section 15a, the turns ratio of the main transformer 27, the state of the switchable means 28L,28H, and the operation of the power control module 29. In the illustrated embodiment of the invention the switchable means 28L,28H comprises a bistable tap changer connected between the secondary winding of the main transformer 27 and an input terminal 31 of the module 29. As is indicated in FIG. 3, the tap changer in one state maintains a contact 28L closed and a contact 28H open, while in another stable state the contact 28H is closed and 28L is open. When the tap changer is in the latter state it is effective to decrease the number of secondary turns of the main transformer and thereby increase the turns ratio compared to when the tap changer is in its former state. Thus, with the contact 28H closed, there is a greater reduction in the magnitude of the voltage applied to the source terminal 26. In practice the same result can alternatively be achieved by providing the primary winding of the main transformer 27 with two sections and by arranging the contacts of the switchable means to connect these sections in parallel in one state of the switchable means and in series in its other state. In yet another variation, useful where the wayside conductor is energized by d-c power rather than a-c power, the switchable means would be arranged to connect a pair of d-c traction motors in parallel in one state of the switchable means and to reconnect the motors in series in the other state.

In the motoring mode of operation, the power control module 29 appropriately conditions the electric power supplied to the armature and the field of each traction motor so that the vehicle is propelled along the right of way at a desired speed and in a desired direction. This module includes a phase-controlled power rectifier bridge and/or other means for varying the voltage (or current) at the load terminal 30 as a function of the value of a variable control signal received on a line 33 from associated control means 34. The latter means in turn responds to a current call signal on a first output line 35 from a master controls block 36 which receives inputs from a throttle 37, an electrical brake controller 38, and a forward/reverse controller 39. The three last-mentioned components comprise a manually operated controller that may either be located on the same vehicle as the other components and circuits shown in FIG. 3 or be remotely located on another vehicle in a train or consist to which the illustrated vehicle is coupled and train-lined. The value of the current call signal on the first output line 35 of the master controls block 36 is varied as a function of the setting of either the throttle 37 or the brake controller 38 and also as a function of the speed of the vehicle. Information regarding the mode of operation of the vehicle (whether motoring or electrically braking; whether a forward or a reverse direction of movement is commanded) is supplied to the power control module 29 over other channels represented in FIG. 3 by a second output line 40 of the master controls 36.

For the reasons explained hereinbefore and in a manner that will now be described, the control means 34, the circuit interrupter 24, and the tap changer 28L,28H are controlled in response to the vehicle traversing predetermined transition points along the right of way so that the propulsion system shown in FIG. 3 is automatically disconnected from the pantograph 16 just before the latter slides across a phase break or voltage-change gap in the wayside catenary and is not thereafter reconnected until after the voltage on the new section of the catenary is measured and the tap changer is actuated (if required) to its proper state. The vehicle's position with respect to the transition point is detected by the proximity sensors PSR and PSL in conjunction with the stationary markers along the right of way and a receiver logic circuit 42 on the vehicle. The receiver logic circuit 42 has been represented in FIG. 3 by a single block; a presently preferred embodiment of this circuit is shown schematically in FIG. 5 which is described hereinafter. A first input line 43 of the circuit 42 is connected to the first proximity sensor PSR, a second input line 44 is connected to the second proximity sensor PSL, and a third input line 45 is connected to reset means 46. The circuit 42 is also connected to the forward/reverse controller 39 via lines 47 and 48 over which it receives alternative forward and reverse command signals, respectively.

Figure 5:
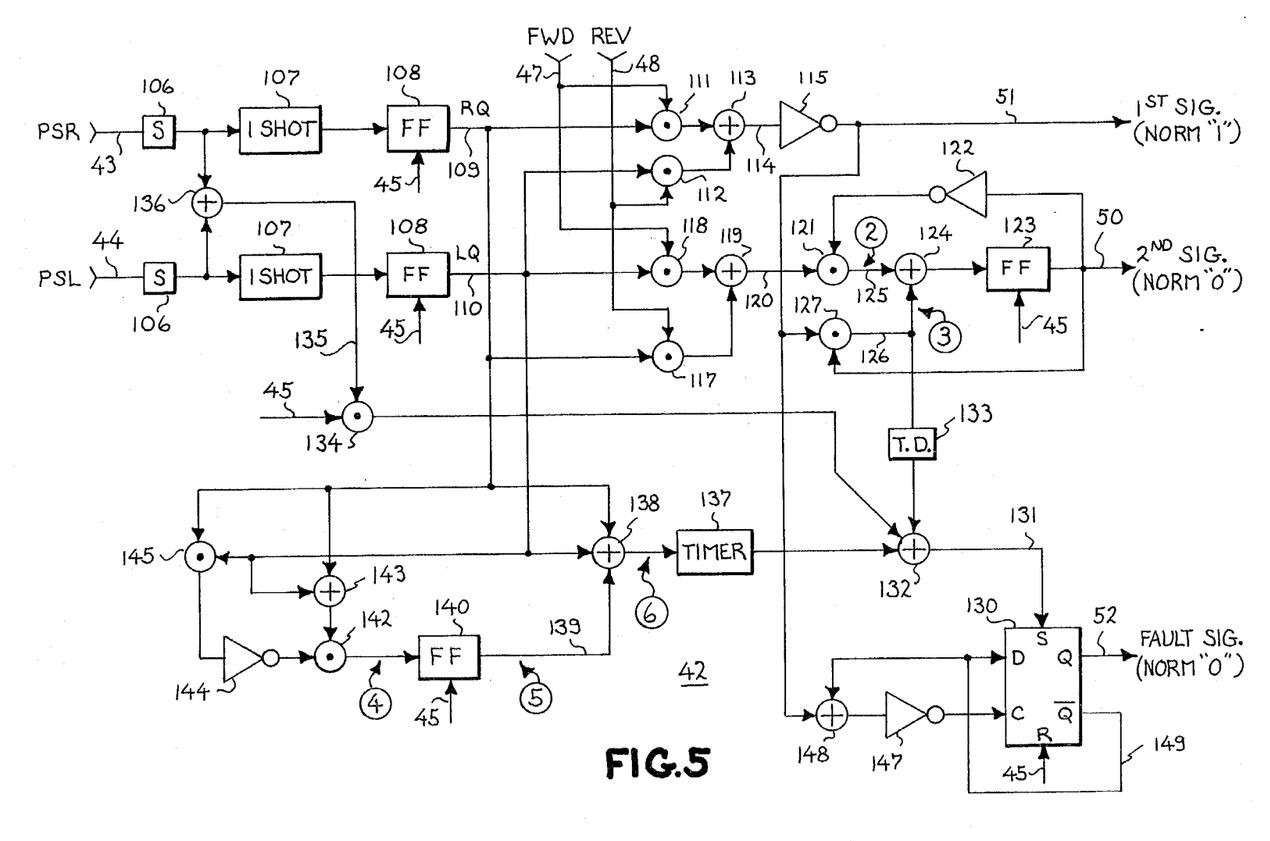
FIG. 5 is a schematic circuit diagram of the preferred embodiment of the receiver logic circuit shown as a single block in FIG. 3.
Figure 6:
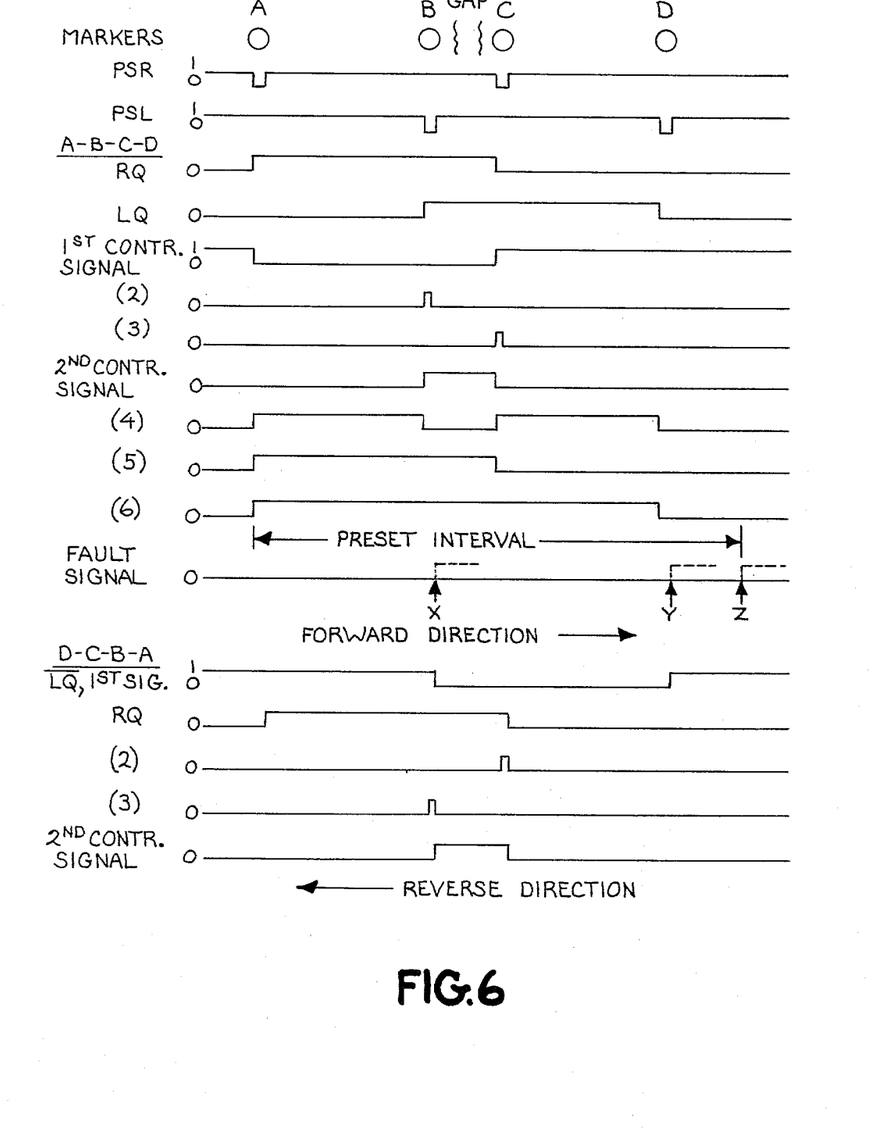
FIG. 6 is a chart showing the states of various signals in the receiver logic circuit of FIG. 5 as the vehicle traverses the transition point in a forward direction and, alternatively, in a reverse direction.

The receiver logic circuit 42 has three output lines 50, 51, and 52. In a manner that will be explained below when FIGS. 5 and 6 are described, the circuit 42 produces on the line 51 a logic signal which is normally high or "1" but which changes to a low or "0" state (hereinafter referred to as the first control signal) in response to the first proximity sensor PSR passing the first marker A as the vehicle approaches a catenary gap and which then reverts to its normal "1" state in response to the sensor PSR passing the third marker C on the exit side of the transition point. In addition, the circuit 42 produces on the output line 50 a logic signal which is normally low or "0" but which changes to a high or "1" state (hereinafter referred to as the second control signal) in response to the second proximity sensor PSL passing the second marker B as the vehicle approaches the catenary gap and which then reverts to its normal "0" state simultaneously with the 0-to-1 signal change on the line 51 in response to the first proximity sensor PSR passing the third marker C. The circuit 42 is also effective to produce on the output line 52 a logic signal which is normally "0" but which changes to a "1" state (hereinafter referred to as the fault signal) if and when there is any discontinuity in the correct sequence of discrete signals that the sensors PSR and PSL provide on the first and second lines 43 and 44, respectively, as they pass all four of the trackside markers A, B, C, and D. The output line 52 is connected to an alarm means 53 for indicating a fault or malfunction of the vehicle position detecting system in response to a fault signal on the line 52.

The first and second control signals on the output lines 51 and 50 of the receiver logic circuit 42 are used to initiate tripping and reclosing of the circuit interrupter 24. The interrupter 24 has an operating mechanism 25 for opening and closing its moveable contacts. Any suitable mechanism can be used. In a practical embodiment the mechanism 25 comprises means responsive to energization of a first electromagnet for actuating the moveable main contacts of the interrupter 24 from open circuit to closed circuit positions and for holding these contacts in the latter position, and separate means is provided for actuating the main contacts from closed circuit to open circuit positions in high speed response to energization of a second electromagnet. For purposes of illustration the operating mechanism 25 is assumed to have a bistable flip-flop type of control that effects closing of the interrupter when commanded by a "1" signal on an input line 55 and that effects opening of the interrupter when commanded by a "1" signal on another input line 56. Conventional interlock contacts (not shown) of the mechanism 25 provide a "1" signal on a line 57 only when the interrupter 24 is open and a "1" signal on a line 58 only when the interrupter is closed.

The circuitry for interconnecting the output lines 50 and 51 of the receiver logic circuit 42 and the input lines 55 and 56 of the operating mechanism 25 is illustrated in FIG. 3 with the aid of logic symbols. Each of the encircled dots symbolizes a conventional AND logic function (output is high or "1" only when all of its inputs are "1", otherwise output is low or "0"), and each of the encircled plus signs symbolizes a conventional OR logic function (output is "1" if any one or more of its inputs is "1", and output is "0" only when all inputs are "0"). Electromechanical hardware or solid state electronic equivalents can be used to implement these logic functions. If electromechanical hardware were used, a closed contact provides a current path and can be regarded as a "1" signal, whereas an open contact inhibits current and can be regarded as a "0" signal.

The output line 51 of the receiver logic circuit 42 is coupled through two AND logic circuits 60 and 61 (which are interconnected by a line 62), a line 63, inverting means 64, another AND logic circuit 65, a time delay component 67, and a line 68 to one input of an OR logic circuit 69. The OR circuit 69 has a second input connected directly to the output line 50 of the circuit 42. One input of yet another AND logic circuit 70 is connected to an output line 71 of the OR circuit 69, and the other input of the circuit 70 is connected to the line 58. The output of the AND logic circuit 70 is coupled through an OR logic circuit 72 to the first input line 55 of the circuit interrupter operating mechanism 25. It will therefore be apparent that with the circuit interrupter 24 closed, and consequently with a "1" signal on the line 58, the line 55 will receive a "1" signal which causes the operating mechanism to open the circuit interrupter 24 whenever a "1" signal is supplied to the line 71. The latter signal is herein referred to as the trip or shutoff signal for the circuit interrupter 24, and it is supplied in response to a 0-to-1 signal change on either of the lines 50 or 68, whichever happens first. A 0-to-1 signal change on the line 68 occurs in delayed response to a 1-to-0 signal change on the line 51 (which marks the start of the first control signal produced by the receiver logic circuit 42). The reason for this delay will soon be explained. A 0-to-1 signal change on the line 50 occurs at the start of the second control signal produced by the circuit 42. Thus a trip signal is supplied to the circuit interrupter in response to the production of either of the first and second control signals.

The AND logic circuit 60 has two inputs in addition to the line 51. One is coupled through inverting means 74 to the line 52, and there is a "1" signal at this input so long as there is not a fault signal on the line 52. The third input of the AND circuit 60 is connected to a line 75 on which there is normally a "1" signal. The output line 62 of the circuit 60 is connected as one input to the AND logic circuit 61 whose other input is connected to the line 58. The output line 63 of the latter circuit is connected as one input to another AND logic circuit 76 whose other input is coupled through inverting means 77 to the line 71. The output of the circuit 76 is coupled to one input of yet another AND logic circuit 78 whose other input is connected to the line 75, and an output line 79 of the latter circuit is connected to a propulsion enable circuit 80 associated with the control means 34. So long as there is a "1" signal on the line 62 and the circuit interrupter 24 is closed, a "1" signal will exist on the line 63 and, assuming at this time that there is not a trip signal on the line 71, a "1" signal is provided on the line 79 to activate the enable circuit 80 which permits normal operation of the control means. However, as soon as the first control signal starts on the output line 51 of the receiver logic circuit 42, there is a signal change from "1" to "0" on each of the lines 62, 63, and 79, and the enable circuit 80 now causes the control means 34 to reduce the value of the control signal on its output line 33, thereby shutting down the propulsion system of the vehicle. Preferably the enable circuit 80 includes rate limiting means so that the control signal on line 33 is gradually reduced in response to the 1-to-0 signal change on the line 79, thereby limiting or avoiding abrupt deceleration of the vehicle.

It will be observed that at the start of the first control signal on line 51 (indicating that the proximity sensor PSR is passing the first marker A as the vehicle approaches a catenary gap) the enable circuit 80 immediately initiates orderly shutdown of the propulsion power, whereas the time delay component 67 temporarily delays production of a trip signal on the line 71 in response to the same event. This delay, which may, for example, be on the order of one-half second, will desirably prevent opening of the circuit interrupter 24 while conducting high propulsion current. The length of this delay and the distance d between the marker A and the catenary gap (see FIG. 1) should be properly coordinated, considering the maximum and minimum allowable speeds of the vehicle and the response times of the power conditioning means and of the circuit interrupter, to ensure that the propulsion power will be adequately reduced when the circuit interrupter opens and that the latter occurs just before the pantograph 16 reaches the catenary gap 14. System reliability is improved by providing the redundant trip signal on the line 71 immediately in response to the production of the second control signal on the output line 50 of the receiver logic circuit 42, indicating that the second proximity sensor PSL is passing the second marker B along the right of way and that the pantograph has almost reached the catenary gap.

As is shown in FIG. 3, another AND logic circuit 81 and inverting means 66 are connected between the line 62 and the AND circuit 65 which in turn is connected to the input of the time delay component 67. A second input of the AND circuit 81 is connected to the line 57, and consequently the inverting means 66 will supply a "1" signal to the AND circuit 65 when the circuit interrupter 24 is closed or when the signal on the line 62 is "0." After the mechanism 25 opens the interrupter 24 in response to a trip signal being supplied to line 71, the next 0-to-1 signal change on the line 62 causes the output of the inverting means 66 to change from "1" to "0," thereby correspondingly changing the input signal to the time delay component 67. The latter component is designed to reset instantaneously so that its output signal on the line 68 immediately reverts to a normal "0" state when its input signal changes from "1" to "0."

Once the circuit interrupter 24 has been opened, it cannot be reclosed until a "1" signal is provided on the input line 56 of the operating mechanism 25. Such a signal is obtained when there are "1" signals on both of the lines 57 and 62 and no trip signal on the line 71. The line 62 is connected to an input of an AND logic circuit 82 whose other input is coupled through the inverting means 77 to the output line 71 of the OR logic circuit 69. One input of another AND logic circuit 83 is connected to an output line 84 of the AND circuit 82, and the other input of the circuit 83 is connected to the line 57. The output of the AND circuit 83 is the line 56. It will therefore be apparent that with the circuit interrupter 24 open and consequently with a "1" signal on the line 57, the line 56 will receive a "1" signal which causes the mechanism 25 to reclose the circuit interrupter 24 whenever a "1" signal is supplied to the line 84. The latter signal is herein referred to as the reclose signal for the circuit interrupter 24, and it is supplied in response to the concurrence of a "0" signal on the line 71 and a "1" signal (which can be regarded as a startup enable signal) on the line 62.

The signal on the line 71 changes from "1" to "0" upon termination of the second control signal on the output line 50 of the receiver logic circuit 42. Assuming there is no fault signal on the line 52, the signal on the line 62 changes from "0" to "1" when the signal on the output line 51 of the circuit 42 changes from "0" to "1" (which marks the termination of the first control signal), unless at that time there is a "0" signal on the line 75, in which case the 0-to-1 signal change on line 62 will occur later, upon return of the normal "1" signal on line 75. There is a "1" signal on the line 75, as will next be explained, whenever the tap changer 28L,28H is in a desired state as determined by the voltage on the line 23 which is connected to the pantograph 16 of the vehicle. Thus the reclose signal is not supplied to the line 84 until both of the first and second control signals are terminated (indicating that the vehicle has traversed the transition point along the right of way and the proximity sensor PSR has passed the third marker C on the far side of the catenary gap) and a "1" signal is produced on the line 75 (indicating that the tap changer is in its proper state).

The "1" signal on the line 75 is produced by verifying means 85 which in FIG. 3 is shown as a single block labeled "Compare." Its functions are to compare the output of a voltage measuring component 86 with the actual state of the switchable means (e.g., the tap changer) 28L,28H and to produce a "1" output signal (herein referred to as an agree signal) on the line 75 whenever the actual state is in agreement with the desired state as indicated by the voltage measuring component 86. The latter component comprises suitable means, such as a capacitance voltage divider and/or a potential transformer, connected to the line 23 for sampling the magnitude of voltage on the pantograph 16 and means responsive to the sampled voltage for determining whether its magnitude is relatively low (L) or high (H). In one practical embodiment of the voltage measuring component 86, a first voltage relay is adjusted to pick up and supply a "1" signal on a first output line 87 when the pantograph voltage attains a threshold of approximately 8 KV, and a second voltage relay is adjusted to pick up and supply a "1" signal on a second output line 88 when the pantograph voltage attains a higher threshold of approximately 14 KV. Thus concurrent "1" signals on both of the lines 87 and 88 indicate that the desired state of the tap charger is high (i.e., it should effect the greatest voltage reduction), whereas a "1" signal on line 87 and a "0" signal on line 88 indicates that the desired state of the tap changer is low (i.e., it should effect the least or no voltage reduction).

An actuating mechanism for moving the contacts 28L and 28H of the tap changer to their respective open and closed positions is illustrated in FIG. 3 by a block 90. Any suitable mechanism can be used for this purpose, and in the illustrated embodiment it is responsive to alternative command signals received on two input lines 91 and 92, respectively. The input line 92 is connected to the output of an AND logic circuit 93 whose inputs are connected, respectively, to the output line 88 of the voltage measuring component 86 and to the output of another AND logic circuit 94. The two inputs of the latter circuit are connected, respectively, to the output line 87 of the component 86 and to the line 57. The input line 91 of the tap changer actuating mechanism 90 is connected to the output of yet another AND logic circuit 95 having one input connected to the output of the AND circuit 94 and another input coupled through inverting means 96 to the line 88. In operation, the illustrated circuitry is effective only when there is a "1" signal on the line 57 (which indicates that the circuit interrupter 24 is open) to supply a "1" command signal to the input line 91 only if there is a "1" signal on the line 87 and not a "1" signal on the line 88 (which is true if the pantograph voltage is above 8 KV but below 14 KV, indicating that a low-voltage state of the tap changer is desired), and to supply a "1" command signal to the input line 92 only when there are "1" signals on both of the lines 87 and 88 (which is true if the pantograph voltage is above 14 KV, indicating that a high-voltage state of the tap changer is desired). The mechanism 90 is suitably constructed and arranged to open the contact 28H and to close 28L in response to a signal change from "0" to "1" on the line 91 and to open the contact 28L and close 28H in response to a signal change from "0" to "1" on the line 92. Consequently the mechanism 90 is effective whenever the circuit interrupter 24 is open and the actual state of the tap changer does not agree with its desired state automatically to actuate the tap changer to its desired state.

The verifying means 85 is responsive to the actual state of the tap changer and to the signals on the output lines 87 and 88 of the voltage measuring component 86 for producing the aforesaid agree signal on the line 75 whenever the actual and desired states of the tap changer are in agreement. Any time the actual and desired states are not in agreement, there is no agree signal on line 75, and consequently no startup enable signal can then be provided on the line 62, no "1" signal can be supplied over the line 79 to activate the propulsion enable circuit 80, and a "1" signal is supplied via inverting means 89 and the OR logic circuit 72 to the input line 55 of the operating mechanism 25 which ensures that the circuit interrupter 24 is open. It will now be apparent that after the vehicle traverses a transition point along the right of way, the circuit interrupter 24 cannot be reclosed prior to monitoring the voltage magnitude of the new catenary section, actuating the tap changer to a different state if its present state does not agree with the desired state indicated by the voltage measuring component 86, and verifying that the actual and desired states of the tap changer are in agreement. Whenever the verifying means 85 is producing an agree signal on the line 75 and, as a result of termination of the first control signal, there is a "1" signal on the output line 51 of the receiver logic circuit 42, the startup enable signal is provided on the line 62. A reclose signal is then produced on the line 84 to command operation of the circuit interrupter 24 from open to closed circuit positions, and as soon as the interrupter is closed, a "1" signal is supplied via the line 63, the AND logic circuits 76 and 78, and the line 79 to the propulsion enable circuit 80 which now permits the power conditioning means to resume its normal operation.

Figure 4:
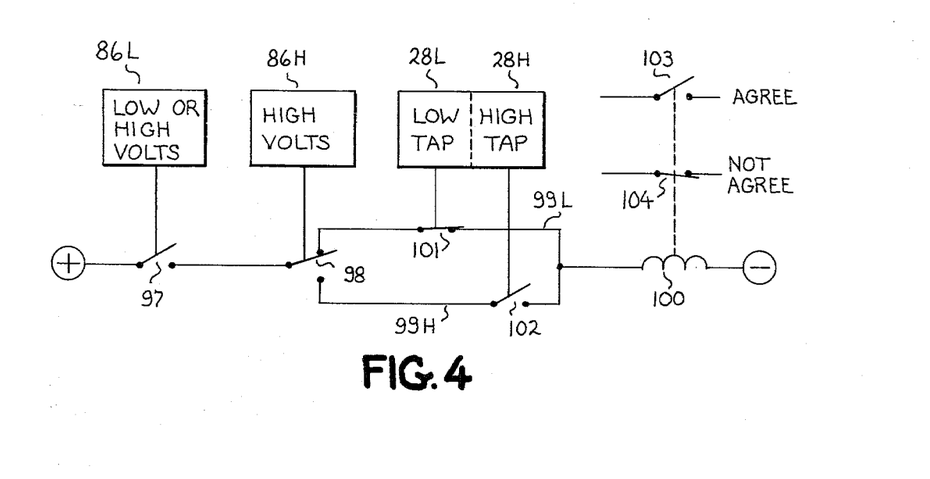
FIG. 4 is a circuit diagram of a practical embodiment of the verifying means shown as a single block labeled "Compare" in FIG. 3.

A practical embodiment of the verifying means 85 is shown by way of example in FIG. 4 which will now be described. A circuit is formed between relatively positive and negative control power terminals by the following serially interconnected components: a normally open single pole switch 97, a double pole switch 98, a pair of parallel circuit branches 99L and 99H, and the operating coil 100 of an electromagnetic relay. The position of the switch 97 is determined by the first voltage relay 87L in the voltage measuring component 86, and it is closed whenever the magnitude of the pantograph voltage is above a predetermined threshold (e.g., 8 KV) that causes 86L to pick up. (When closed, the switch 97 has the same effect as a "1" signal on the line 87 in FIG. 3.) The position of the switch 98 is determined by the second voltage relay 86H in the component 86. Normally, as is shown in FIG. 4, the switch 98 makes contact with the branch 99L of the circuit, but it moves into contact with the branch 99H whenever the magnitude of pantograph voltage exceeds a predetermined higher threshold (e.g., 14 KV) that causes 86H to pick up. The parallel branches 99L and 99H respectively include a pair of interlock contacts 101 and 102 that represent limit switches associated with the tap changer; the interlock contact 101 is closed whenever the contact 28L of the tap changer is closed, and the interlock contact 102 is closed whenever the contact 28H of the tap changer is closed. It will now be apparent that with 86L but not 86H picked up and with the contact 101 closed, there is agreement between the desired and actual states of the tap changer and a current conducting path including the branch 99L is provided for energizing the coil 100. Also, with both 86L and 86H picked up and with the contact 102 closed, there is again agreement between the desired and actual states of the tap changer and a conducting path including the branch 99H is provided for energizing the coil 100. Upon energization of the coil 100, a normally open contact 103 of the electromagnetic relay is actuated to its closed position and a normally closed contact 104 is opened. When the contact 103 closes, it has the same effect as a "1" signal (i.e., the agree signal) on the line 75 in FIG. 3. It will open whenever the coil 100 is deenergized in response to either dropout of 86L (due to low or no voltage on the pantograph) or disagreement between desired and actual states of the tap changer, and without the agree signal the interrupter 24 will be and stayed opened. Suitable means (not shown) is provided to delay the dropout of the electromagnetic relay if the energizing path of its coil 100 were accidentally interrupted as a result of pantograph bounce which could cause the voltage relays 86L and 86H momentarily to drop out and open their respective contacts 97 and 98.

Turning now to FIG. 5, the presently preferred embodiment of the receiver logic circuit 42 will be described. The first input line 43 of the circuit 42, on which the discrete output signals from the first proximity sensor PSR are provided, is connected through filtering or integrating means 106 in tandem with pulse stretching means 107 to the input of bistable flip-flop means 108. The latter device produces on an output line 109 a signal RQ which is low or "0" when the flip-flop 108 is in a first or reset state but high or "1" when in its second or set state. The purpose of the filtering means 106 is to require an output signal from the proximity sensor to be substained without interruption for at least a predetermined minimum interval of time (e.g., 0.4 miliseconds) before passing a "1" signal to the pulse stretching means 107, thereby avoiding any undesired state change of the flip-flop 108 in response to short-term spurious signals from the sensor that can be caused by contact bounce (i.e., a momentary opening of the reed switch contact due to mechanical vibration or shock). Hardware well suited for this purpose is known as a contact bounce eliminator and is commercially available (Model MC14490) from Motorola Semiconductor Products, Inc. The purpose of the pulse stretcher 107 is to ensure that there is only one 0-to-1 signal transition at the input of the flip-flop 108 each time the sensor PSR is in close proximity to a trackside marker, thereby avoiding premature reset (or set) of the flip-flop in the event PSR provides two discrete output signals in quick succession while passing over a marker. Such double pulsing could happen if the sensor were momentarily removed from and then immediately returned to the influence of the magnetic field of a marker due to verticle vibration of its supporting member 20. In a practical embodiment the minimum width of the pulse stretcher output pulse can be on the order of 0.2 second. Hardware well suited for this purpose is known as a one-shot or retriggerable monostable multivibrator and is commercially available (model MC14538B) from Motorola Semiconductor Products, Inc.

Assuming that the flip-flop 108 is in its reset state before the proximity sensor PSR reaches the first trackside marker A as the vehicle 11 approaches the catenary gap 14 from the direction indicated in FIG. 1 (which state can be assured by prior operation of the reset means 46 shown in FIG. 3 so as to supply a short duration reset pulse over the line 45 to a reset input of the flip-flop), the first output signal from PSR causes a 0-to-1 signal transition at the input of the flip-flop, whereupon the latter device is operative to change states and thereby raise the level of the signal RQ from "0" to "1." Subsequently, when the same proximity sensor passes the third marker C, the next output signal from PSR causes another 0-to-1 signal transition at the input of the flip-flop 108, and this device is then operative to change states again and thereby lower the level of the signal RQ from "1" to "0." In FIG. 6 the resulting states of the signal RQ have been charted as a function of the position of PSR as the vehicle traverses a transition point in a forward direction (marker sequence: A-B-C-D) and also in a reverse direction (marker sequence: D-C-B-A).

A second channel of duplicate components 106, 107, and 108 is connected to the second input line 44 of the receiver logic circuit 42 shown in FIG. 5, and the flip-flop means 108 in this channel produces on its output line 110 a signal LQ which changes state in response to successive output signals that are provided on the line 44 by the second proximity sensor PSL. When the first output signal is provided by PSL, indicating that this sensor is passing the second wayside marker B as the vehicle approaches the transition point from the direction indicated in FIG. 1, there is a 0-to-1 signal transition at the input of the associated flip-flop 108, and the signal LQ changes correspondingly. Subsequently, when the same proximity sensor passes the fourth marker D, the next output signal from PSL causes another 0-to-1 signal transition at the input of the associated flip-flop and the signal LQ then changes from "1" to "0." In FIG. 6 the signal LQ is shown for the forward direction of movement, and its complement ($\overline{LQ}$) is shown for the reverse direction.

As can be seen in FIG. 5, the output lines 109 and 110 of the two flip-flops 108 are respectively connected through AND logic circuits 111 and 112 to an OR logic circuit 113. One input of the AND circuit 111 is connected to the line 47, and whenever a forward command signal (i.e., a "1" signal) is provided on this line, the signal on an output line 114 of the OR circuit 113 will track the signal RQ on line 109. One input of the AND circuit 112 is connected to the line 48, and whenever a reverse command signal (i.e., a "1" signal) is provided on this line, the signal on the output line 114 is inverted by inverting means 115 which connects this line to the output line 51 of the receiver logic circuit 42. As was previously explained, a 1-to-0 signal change on the output line 51 coincides with the start of the first output signal that the circuit 42 produces, and a 0-to-1 signal change on this line coincides with the termination of the first control signal. The first control signal is charted in FIG. 6 for both the forward and the reverse directions of movement of the vehicle.

The output lines 109 and 110 of the two flip-flops 108 are respectively connected through two additional AND logic circuits 117 and 118 to another OR logic circuit 119. One input of the AND circuit 118 is connected to the line 47, and whenever a forward command signal is provided on this line the signal on an output line 120 of the OR circuit 119 will track the signal LQ on line 110. One input of the AND circuit 117 is connected to the line 48, and whenever a reverse command signal is provided on this line the signal on the output line 120 will track the signal RQ on the line 109.

The output line 120 of the OR logic circuit 119 is connected to one input of an AND logic circuit 121 whose other input is connected through inverting means 122 to the output (line 50) of bistable flip-flop means 123. The input of this flip-flop is connected through an OR circuit 124 to an output line 125 of the AND circuit 121 and also to an output line 126 of yet another AND logic circuit 127. The two inputs of the latter circuit are respectively connected to the output lines 50 and 51. Assuming that the flip-flop 123 is in a reset state (i.e., a "0" signal on its output line 50) before the proximity sensor PSL reaches the second marker B as the vehicle approaches the transition point from the direction indicated in FIG. 1, a 0-to-1 change of the signal LQ will cause a corresponding change of the signal (2) on the output line 125 of the AND circuit 121, whereupon the flip-flop 123 is set and the signal on its output line 50 changes from "0" to "1." As soon thereafter as there is a 0-to-1 signal change on the output line 51, which occurs simultaneously with the termination of the first control signal, there is a corresponding change of the signal (3) on the output line 126 of the AND circuit 127, whereupon the flip-flop 123 is reset and its output signal then changes from "1" to "0." As was previously explained, a 0-to-1 change on the output line 50 coincides with the start of the second output signal that the circuit 42 produces, and a 1-to-0 signal change on this line coincides with the termination of the second control signal. It will now be apparent that the receiver logic circuit 42 is effective to produce the second control signal while both of the flip-flop means 108 are contemporaneously in their respective set states (i.e., both of the signals RQ and LQ are "1"). The signal (2) on line 125, the signal (3) on line 126, and the second control signal on line 50 are all charted in FIG. 6 for both forward and reverse directions.

The above-described components and circuits of the receiver logic circuit 42 are operative to produce on the output line 51 the first control signal that commences (i.e., changes state from "1" to "0") whenever the proximity sensing means on the vehicle 11 reaches a position above the first one of the four trackside markers associated with a predetermined transition point (i.e., marker A if the vehicle is moving in the forward direction, marker D if in the reverse direction). They are also operative to produce on the output line 50 the second control signal that commences (i.e., changes state from "0" to "1") whenever the proximity sensing means reaches a position above the next marker in the normal sequence (i.e., marker B if the vehicle is moving forward, marker C if reverse). Both the first and second control signals are simultaneously terminated as the proximity sensing means passes above the third marker in the sequence of four (i.e., marker C if the vehicle is moving in the forward direction, marker B in the reverse direction).

Additional components and circuits are included in the receiver logic circuit 42 to produce a fault signal on the third output line 52 in response to a malfunction of the position detecting system. The output line 52 is connected to the Q output of a type D flip-flop device 130. The signal at this output is normally low or "0", but it is switched to a "1" state (indicating a malfunction) whenever a "1" signal is supplied over a line 131 to the set input of the device 130. The line 131 is connected to the output of an OR logic circuit 132 having three alternative inputs. A first one of these inputs is connected to the line 126 through a time delay component 133 which can have the same construction as the previously described filtering or integrating means 106. In normal operation the signal (3) on the line 126 is in a "1" state for a relatively short duration (see FIG. 6) while the flip-flop 123 is resetting in response to the 0-to-1 signal change on the line 51 as the proximity sensing means passes the third trackside marker in the normal sequence, and the time delay component 133 inhibits this "1" signal on line 126 from reaching the line 131. However, in the abnormal event that the second control signal is produced on the output line 50 at a time when a first control signal is not being produced on the output line 51, which event is indicated by a 0-to-1 signal change on the line 50 while there is a "1" signal on line 51, a "1" signal of longer duration will be provided on the line 126. After a brief delay (e.g., 0.4 millisecond) the component 133 will now supply a "1" signal through the OR circuit 132 to the line 131, whereupon the device 130 produces a fault signal on the output line 52. Such an abnormal event would occur if the vehicle were moving in a forward direction and either the first marker A or the second marker B were missing from the track side. If the first marker were missing, the fault signal would start at point X in FIG. 6; if the second marker were missing, the fault signal would start at point Y.

The second input of the OR logic circuit 132 is connected to the output of an AND logic circuit 134 whose two inputs comprise, respectively, the reset pulse line 45 and an output line 135 of another OR logic circuit 136. The inputs of the latter circuit are connected to the outputs of the respective filtering means 106, whereby a "1" signal is provided on the line 135 concurrently with each discrete output signal from either of the proximity sensors PSR and PSL. This permits checking for a malfunction of the proximity sensing means by operating the reset means 46 (see FIG. 3) before the vehicle 11 is in the vicinity of a catenary gap 14. Operation of the reset means provides a short duration "1" pulse on the line 45. If there is then no "1" signal on the line 135, the proximity sensing means is sound. However, if at that time there is a "1" signal on the line 135, the AND circuit 134 will supply a 1 signal through the OR circuit 132 to the line 131, whereupon the device 130 produces a fault signal on the output line 52 (indicating that a reed switch contact in at least one of the proximity sensors, or a connection between the reed switch and one of the input lines 43 and 44 of the receiver logic circuit 42, is improperly open).

The third input of the OR circuit 132 is connected to the output of a timer 137. This timer has a normally low or "0" output state, and it is suitably constructed and arranged to produce a "1" signal at its output after its input has been continuously activated by a "1" signal for a predetermined time interval (e.g., in the range of 70 to 90 seconds) which is slightly longer than the maximum time that normally elapses between the proximity sensor PSR passing the first trackside marker A and the proximity sensor PSL passing the fourth trackside marker D as the vehicle 11 moves along the right of way in the vicinity of a catenary gap. Hardware well suited for this purpose is known as a programmable timer and is commercially available (model MC14536B) from Motorola Semiconductor Products, Inc.

The input signal for the timer 137 is taken from the output of an OR logic circuit 138 having a first input connected to the line 109, a second input connected to the line 110, and a third connected to an output line 139 of another bistable flip-flop means 140. The input to the flip-flop 140 is also connected to the lines 109 and 110 through an exclusive OR logic circuit represented in FIG. 5 by an AND circuit 142 whose first input is connected to an OR circuit 143 and whose second input is connected through inverting means 144 to another AND circuit 145. Both inputs of the OR circuit 143 and both inputs of the AND circuit 145 are connected to the lines 109 and 110, respectively. The signal (4) on the input line of the flip-flop 140, the signal (5) on the output line 139 of this flip-flop, and the input signal (6) for the timer 137 are all charted in FIG. 6 for the forward direction of movement. It will be apparent that the timer input signal (6) is "1" so long as there is a "1" signal on either of the lines 109 and 110. The signal RQ on line 109 is "1" concurrently with the first control signal that is produced on the output line 51, starting when PSR passes marker A and terminating when PSR passes marker C (assuming a forward direction of movement). The signal LQ on the line 110 is "1" throughout a period of time beginning when PSL reaches marker B to start the second control signal on the output line 50 and ending when the next discrete signal is provided on the second input line 44 of the receiver logic circuit 42, thereby indicating that PSL is passing the fourth trackside marker D (again assuming a forward direction).

In normal operation, the "1" state of the resulting input signal (6) that activates the timer 137 commences when the proximity sensing means reaches the initial trackside marker (A in the forward direction, D in reverse) and continues without interruption until the end of the last-mentioned period when the proximity sensing means passes the last of the four markers (D in the forward direction, A in reverse), whereupon the timer automatically resets before it has been activated long enough to produce a "1" output signal. However, in the abnormal event that either (or both) of the last and the next to last trackside markers were missing, either the signal RQ or the signal LQ (or both) will remain in a "1" state so that the input signal (6) continues to activate the timer for its full preset interval, and upon the expiration of that interval (at point Z in FIG. 6) the timer 137 supplies a "1" signal through the OR circuit 132 to the line 131 which causes the device 130 to produce a fault signal on the output line 52. Note that the timer 137 would also initiate a fault signal if both of the first two trackside markers A and B were missing (or pair C and D in the reverse direction), in which case point Z in FIG. 6 would be displaced to the right an amount equivalent to the time required for PSR to travel from the nominal location of marker A to the location of marker C.

The flip-flop 140 and the associated exclusive OR circuit 142–145 are provided to ensure that a fault signal is produced in the abnormal event that either pair A and C or pair B and D of the trackside markers is missing or that either of the proximity sensors PSR and PSL has failed. To illustrate the operation of this part of the system, assume first that the vehicle is moving in a forward direction and that the proximity sensing means fails to provide discrete output signals on the second input line 44 of the circuit 42 either because the pair of markers B and D is missing or because the sensor PSL is defective. In this case the signal LQ on the line 110 remains "0" as the vehicle traverses a catenary gap, and the receiver logic circuit fails to produce the second control signal on the output line 50 at any time during and subsequent to the interval that the first control signal is being produced on the output line 51. When PSR passes the marker C and the signal RQ on the line 109 consequently changes from "1" to "0" (thereby terminating the first control signal on the output line 51), the input signal (4) to the flip-flop 140 will change from "1" to "0" rather than from "0" to "1". As a result, the flip-flop 140 is not reset and its output signal (5) will remain high, whereby a "1" input signal (6) continues to activate the timer 137 for its full preset interval. Upon expiration of the latter interval, the timer 137 supplies a "1" signal through the OR circuit 132 to the line 131 which causes the flip-flop device 130 to produce a fault signal on the output line 52. Assume now that the pair of markers A and C rather than B and D is missing or the proximity sensor PSR rather than PSL has failed, whereby no discrete signals are provided on the first input line 43 of the receiver logic circuit and this circuit fails to produce the first control signal on its output line 51 at any time during and subsequent to the period that the signal LQ on the line 110 is in a "1" state. When PSL passes the marker D and the signal LQ consequently returns to its "0" state, the input signal (4) to the flip-flop 140 will change from "1" to "0" rather than from "0" to "1". As a result, the flip-flop 140 is not reset, its output signal (5) remains high, the timer input signal (6) remains continuously "1" for longer than the preset timing interval, and the timer 137 can output a "1" signal to ensure that a fault signal exists on the output line 52.

If, because of a missing marker in the vicinity of one transition point along the right of way, a fault signal has been produced on the output line 52, it is desirable automatically to clear the fault signal when the vehicle reaches a new series of markers in the vicinity of the next transition point. For this purpose the clock input of the type D flip-flop device 130 is connected through inverting means 147 and an OR logic circuit 148 to the output line 51 of the receiver logic circuit 42, and the Q̄ output of the device 130 is connected to the OR circuit 148 and to the data input of the same device. When the proximity sensing means passes the first marker as the vehicle is approaching a transition point (marker A in the forward direction, marker D in the reverse direction), there is simultaneously a 1-to-0 signal change on the line 51 and, if the device 130 were previously set (Q=1, Q̄=0), a 0-to-1 signal change on the clock input of this device. As a result the device 130 is reset and the signal on the output line 52 reverts to "0". Manual reset of the flip-flop device 130 (and of the other flip-flops 108, 123, and 140 in the receiver logic circuit 42) can be accomplished when desired by supplying a reset pulse to the line 45. The reset means 46 (FIG. 3) is arranged to do this automatically in response to turning on control power to the receiver logic circuit.

While a preferred embodiment of the invention has been shown and described by way of example, many modifications will undoubtedly occur to persons skilled in the art. For example, the voltage measuring means 86 could be responsive to the frequency of the alternating voltage on the pantograph instead of or in addition to being responsive to the magnitude of that voltage. The concluding claims are therefore intended to cover all such modifications as fall within the true spirit and scope of the invention.

We claim:

1. For use in combination with an electrically propelled land vehicle moving along a predetermined path in a right of way that is paralleled by a sectionalized wayside conductor, adjacent sections of said conductor being respectively energized by different sources of electric power and being electrically insulated from one another at a predetermined transition point along said right of way, said vehicle including a current collector that cooperates with said wayside conductor to provide on board the vehicle a voltage whose magnitude is determined by the voltage magnitude of the power source energizing the particular section of said conductor with which said collector is cooperating, said vehicle additionally including controllable power conditioning means having source and load terminals, means including circuit interrupting means for connecting said source terminals to said current collector, and at least one electric motor connected to the load terminals of said power conditioning means for propelling the vehicle along said right of way in a desired direction as determined by alternative forward and reverse command signals, said power conditioning means including switchable means having alternative states in at least one of which said switchable means is effective to reduce the magnitude of voltage applied to said source terminals, said circuit interrupting means being operable from closed circuit to open circuit positions and vice versa when commanded by trip and reclose signals, respectively, an improved system for automatically controlling said switchable means and said circuit interrupting means in response to the vehicle traversing said predetermined transition point, wherein the improvement comprises:

a. at least first, second, third, and fourth stationary markers adapted to be placed at predetermined locations in said right of way in the vicinity of said predetermined transition point, the locations of said first and second markers being on one side of said transition point with said first marker being spaced farther than said second marker from said transition point and the locations of said third and fourth markers being on the other side of said transition point with said fourth marker being spaced farther than said third marker from said transition point;

b. Proximity sensing means placed on said vehicle so as to pass in close proximity to said stationary markers as the vehicle moves along said right of way in the vicinity of said predetermined transition point, said proximity sensing means being arranged to provide, upon passing said first marker and also upon passing said third marker, discrete output signals on a first line and to provide, upon passing said second marker and also upon passing said fourth marker, discrete output signals on a second line;

c. first means responsive to a forward command signal and to the output signals on said first line for producing a first control signal that starts when said proximity sensing means provides an output signal indicating it is passing said first marker as the vehicle approaches said predetermined transition point from said one side and that terminates when said sensing means provides the next output signal on said first line thereby indicating it is passing said third marker on the other side of said transition point;

d. second means responsive to a forward command signal and to the output signals on said second line for producing a second control signal that starts when said proximity sensing means provides an output signal indicating it is passing said second marker on said one side of said transition point, said second means also being responsive to said next output signal that is provided on said first line for terminating said second control signal simultaneously with the termination of said first control signal when said third marker is passed;

e. means responsive to said first control signal for supplying a trip signal to said circuit interrupting means, whereby the circuit between said power conditioning means and said current collector is open as the vehicle traverses said transition point;

f. means connected to said current collector for measuring the voltage on said collector and, based on that measurement, for indicating the desired state of said switchable means;

g. means connected to said voltage measuring means and effective only when said circuit interrupting means is open and the actual state of said switchable means does not agree with said desired state for actuating said switchable means to its desired state;

h. verifying means connected to said voltage measuring means and responsive to the state of said switchable means for producing an agree signal whenever the actual and desired states of said switchable means are in agreement; and i. means connected to said first and second means and responsive to said agree signal for supplying a reclose signal to said circuit interrupting means when said agree signal is produced and both of said first and second control signals are terminated.

2. The improved system as set forth in claim 1 wherein said trip signal supplying means includes time delay means for temporarily delaying its response to the production of said first control signal, the improved system further comprising means connected to said first means and responsive to the start of said first control signal for controlling said power conditioning means so that the electric power delivered to said motor is reduced before said trip signal is supplied to said circuit interrupting means.

3. The improved system as set forth in claim 1 wherein said first and third markers are displaced laterally from said second and fourth markers with respect to the path of movement of the vehicle along said right of way and wherein said proximity sensing means comprises first and second sensors arranged to provide discrete output signals on said first and second lines, respectively, when in proximity to said markers, said first sensor being mounted on a part of said vehicle that passes in close proximity to said first and third markers as the vehicle moves along the right of way in the vicinity of said predetermined transition point, and said second sensor being mounted on a part of said vehicle that passes in close proximity of said second and fourth markers as the vehicle moves along the right of way in the vicinity of said predetermined transition point.

4. The improved system as set forth in claim 1 wherein said first means is responsive to a reverse command signal and to the output signals on said second line for producing said first control signal starting when said proximity sensing means provides an output signal indicating it is passing said fourth marker as the vehicle approaches said predetermined transition point from said other side and terminating when said sensing means provides the next output signal on said second line thereby indicating it is passing said second marker on said one side of said transition point, and wherein said second means is responsive to a reverse command signal and to the output signals on said first line for producing said second control signal starting when said sensing means provides an output signal indicating it is passing said third marker on said other side of said transition point, said second means also being responsive to said next output signal that is provided on said second line for terminating said second control signal simultaneously with the termination of said first control signal when said second marker is passed.

5. For use in combination with an electrically propelled land vehicle moving along a predetermined path in a right of way that is paralleled by a sectionalized wayside conductor energized by at least one source of electric power, adjacent sections of said conductor being electrically insulated from one another at a predetermined transition point along said right of way, said vehicle including a current collector that cooperates with said wayside conductor to provide on board the vehicle a voltage whose magnitude is determined by the voltage magnitude of the power source energizing the particular section of said conductor with which said collector is cooperating, said vehicle additionally including controllable power conditioning means having source and load terminals, means for connecting said source terminals to said current collector, and at least one electric motor connected to the load terminals of said power conditioning means for propelling the vehicle along said right of way in a desired direction as determined by alternative forward and reverse command signals, said connecting means including circuit interrupting means operable from closed circuit to open circuit positions and vice versa when commanded by trip and reclose signals, respectively, an improved system for automatically controlling said circuit interrupting means in response to the vehicle traversing said predetermined transition point, wherein the improvement comprises:

a. at least first, second, third, and fourth stationary markers adapted to be placed at predetermined locations in said right of way in the vicinity of said predetermined transition point, the locations of said first and second markers being on one side of said transition point with said first marker being spaced farther than said second marker from said transition point and the locations of said third and fourth markers being on the other side of said transition point with said fourth marker being spaced farther than said third marker from said transition point;

b. proximity sensing means placed on said vehicle so as to pass in close proximity to said stationary markers as the vehicle moves along said right of way in the vicinity of said predetermined transition point, said proximity sensing means being arranged to provide, upon passing said first marker and also upon passing said third marker, discrete output signals on a first line and to provide, upon passing said second marker and also upon passing said fourth marker, discrete output signals on a second line;

c. first means responsive to a forward command signal and to the output signals on said first line for producing a first control signal that starts when said proximity sensing means provides an output signal indicating it is passing said first marker as the vehicle approaches said predetermined transition point from said one side and that terminates when said sensing means provides the next output signal on said first line thereby indicating it is passing said third marker on the other side of said transition point;

d. second means responsive to a forward command signal and to the output signals on said second line for producing a second control signal that starts when said proximity sensing means provides an output signal indicating it is passing said second marker on said one side of said transition point, said second means also being responsive to said next output signal that is provided on said first line for terminating said second control signal simultaneously with the termination of said first control signal when said third marker is passed;

e. means responsive to the production of either said first or second control signal for supplying a trip signal to said circuit interrupting means, whereby the connection between said current collector and the source terminals of said power conditioning means is open as the vehicle traverses said transition point; and f. means responsive to the termination of both said first and said second control signals for supplying a reclose signal to said circuit interrupting means.

6. The improved system as set forth in claim 5 wherein said trip signal supplying means includes time delay means for temporarily delaying its response to the production of said first control signal, the improved system further comprising means connected to said first means and responsive to the start of said first control signal for controlling said power conditioning means so that the electric power delivered to said motor is reduced before said trip signal is supplied to said circuit interrupting means.

7. The improved system as set forth in claim 5 wherein said first and third markers are displaced laterally from said second and fourth markers with respect to the path of movement of the vehicle along said right of way and wherein said proximity sensing means comprises first and second sensors arranged to provide discrete output signals on said first and second lines, respectively, when in proximity to said markers, said first sensor being mounted on a part of said vehicle that passes in close proximity to said first and third markers as the vehicle moves along the right of way in the vicinity of said predetermined transition point, and said second sensor being mounted on a part of said vehicle that passes in close proximity of said second and fourth markers as the vehicle moves along the right of way in the vicinity of said predetermined transition point.

8. The improved system as set forth in claim 5 wherein said first means is responsive to a reverse command signal and to the output signals on said second line for producing said first control signal starting when said proximity sensing means provides an output signal indicating it is passing said fourth marker as the vehicle approaches said predetermined transition point from said other side and terminating when said sensing means provides the next output signal on said second line thereby indicating it is passing said second marker on said one side of said transition point, and wherein said second means is responsive to a reverse command signal and to the output signals on said first line for producing said second control signal starting when said sensing means provides an output signal indicating it is passing said third marker on said other side of said transition point, said second means also being responsive to said next output signal that is provided on said second line for terminating said second control signal simultaneously with the termination of said first control signal when said second marker is passed.

9. The improved system as set forth in claim 5 and further comprising first and second bistable flip-flop means connected to said first and second lines, respectively, said first flip-flop means being operative to change from first to second states in response to a first one of said output signals provided by said proximity sensing means on said first line and to change from second to first states in response to the succeeding output signal on said first line, and said second flip-flop means being operative to change from first to second states in response to a first one of said output signals provided by said sensing means on said second line and to change from second to first states in response to the succeeding output signal on said second line, said first means being effective to produce said first control signal while said first flip-flop means is in its second state and said second means being effective to produce said second control signal while both of said first and second flip-flop means are contemporaneously in their respective second states.

10. The improved system of claim 5 for use in combination with a vehicle whose current collector cooperates with a wayside conductor having adjacent sections respectively energized by different sources of electric power and whose power conditioning means includes means switchable between alternative states in at least one of which it is effective to reduce the magnitude of voltage applied to said source terminals, wherein the improvement further comprises means connected to said current collector for measuring the voltage on said collector and, based on that measurement for indicating the desired state of said switchable means, means connected to said voltage measuring means and effective only when said circuit interrupting means is open for actuating said switchable means if the actual and desired states thereof are not in agreement, and verifying means connected to said voltage measuring means and responsive to the state of said switchable means for producing an agree signal whenever the actual and desired state of said switchable means are in agreement, said reclose signal supplying means being responsive to said agree signal for supplying said reclose signal to said circuit interrupting means when said agree signal is produced and both of said first and second control signals are terminated.

11. The improved system as set forth in claim 5 and further comprising means connected to said first and second means for indicating a malfunction of said system in the event said second means produces said second control signal at a time when said first means has failed to produce a first control signal.

12. The improved system as set forth in claim 5 and further comprising time delay means for indicating a malfunction of the system after the time delay means has been continuously activated for a predetermined time interval which is longer than the maximum time that normally elapses between said proximity sensing means passing said first and fourth markers as the vehicle moves along the right of way in the vicinity of said predetermined transition point, said time delay means being connected to said first means for activation so long as said first control signal is being produced and being connected to said second means for activation during a period of time beginning with the start of said second control signal and ending when said proximity sensing means provides the next output signal on said second line thereby indicating it is passing said fourth marker.

13. The improved system as set forth in claim 12 wherein means is provided for continuing to activate said time delay means after the end of said period of time in the event said first means fails to produce a first signal at any time during and subsequent to said period and for continuing to activate said time delay means after termination of said first control signal in the event said second means fails to produce a second control signal at any time during and subsequent to the interval that said first control signal is being produced.

14. The improved system as set forth in claim 12 wherein said first and third markers are displaced laterally from said second and fourth markers with respect to the path of movement of the vehicle along said right of way and wherein said proximity sensing means comprises first and second sensors arranged to provide discrete output signals on said first and second lines, respectively, when in proximity to said markers, said first sensor being mounted on a part of said vehicle that passes in close proximity to said first and third markers as the vehicle moves along the right of way in the vicinity of said predetermined transition point, and said second sensor being mounted on a part of said vehicle that passes in close proximity to said second and fourth markers as the vehicle moves along the right of way in the vicinity of said predetermined transition point.

15. The improved system as set forth in claim 12 wherein said first means is responsive to a reverse command signal and to the output signals on said second line for producing said first control signal starting when said proximity sensing means provides an output signal indicating it is passing said fourth marker as the vehicle approaches said predetermined transition point from said other side and terminating when said sensing means provides the next output signal on said second line thereby indicating it is passing said second marker on said one side of said transition point, and wherein said second means is responsive to a reverse command signal and to the output signals on said first line for producing said second control signal starting when said sensing means provides an output signal indicating it is passing said third marker on said other side of said transition point, said second means also being responsive to said next output signal that is provided on said second line for terminating said second control signal simultaneously with the termination of said first control signal when said second marker is passed.

16. The improved system as set forth in claim 12 and further comprising additional means connected to said first and second means for indicating a malfunction of said system whenever said second control signal is produced in the absence of a first control signal.

* * * * *

UNITED STATES PATENT AND TRADEMARK OFFICE
CERTIFICATE OF CORRECTION

PATENT NO. : 4,301,899

DATED : Nov. 24, 1981

INVENTOR(S) : Lloyd W. McSparran; Paul T. Ryan, Russell M. Smith

It is certified that error appears in the above–identified patent and that said Letters Patent are hereby corrected as shown below:

Column 1, line 20, "in" (first occurrence) should be corrected to -- an --

Column 3, line 30, delete "release" and substitute -- reclose --

Column 15, line 2, delete "87L" and substitute -- 86L --

Signed and Sealed this

Twenty-first Day of December 1982

[SEAL]

Attest:

GERALD J. MOSSINGHOFF

Attesting Officer   Commissioner of Patents and Trademarks